United States Patent
Rao et al.

(10) Patent No.: US 8,573,640 B2
(45) Date of Patent: Nov. 5, 2013

(54) SIDE COLLISION OCCUPANT PROTECTION SYSTEM

(75) Inventors: Manoharprasad K. Rao, Novi, MI (US); Jailiang Le, Canton, MI (US); Mangala Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/418,397

(22) Filed: Mar. 13, 2012

(65) Prior Publication Data

US 2013/0241182 A1 Sep. 19, 2013

(51) Int. Cl.
*B60R 21/16* (2006.01)
(52) U.S. Cl.
USPC .......................................................... 280/735
(58) Field of Classification Search
USPC .................................. 280/735; 180/271, 274
See application file for complete search history.

(56) References Cited

U.S. PATENT DOCUMENTS 6,547,315 B1 * 4/2003 Rajasingham ........... 296/187.12
8,136,835 B2 * 3/2012 Rajasingham ................ 280/736

* cited by examiner

*Primary Examiner* — Faye M. Fleming
(74) *Attorney, Agent, or Firm* — Joseph E. Root

(57) ABSTRACT

A system and a method for protecting the occupant of a vehicle during a side-impact detects an approaching vehicle and identifies a collision threat. A collision threat level is assessed based on a set of parameters, and when the collision threat exceeds a pre-determined collision threat threshold level, the system unlatches the occupant's door, pushes it a few centimeters outwards, and locks it in that position. Pressure sensors and accelerometers disposed at suitable locations on the sides of the vehicle, provide crash signals to a Restraint Control Module (RCM). When the crash signals exceed a certain threshold, the RCM commands an airbag deployment module to deploy the airbag between the occupant and the door. Since the door is pushed outwards, an extra pre-crush space is created between the occupant and the door, which allows the use of larger and softer side airbags to provide enhanced protection to the vehicle occupants.

16 Claims, 8 Drawing Sheets

Prior-art

SIDE COLLISION OCCUPANT PROTECTION SYSTEM

BACKGROUND

The present disclosure relates to vehicle safety and protection systems, and more specifically, to side-impact protection systems based on pre-crash sensing.

Side-impact protection systems are now being provided in vehicles to reduce the risk of injury to the vehicle occupants during side collisions. Many of these protection systems use airbags that get deployed a few milli-seconds after a collision occurs, with the airbags softening the impact to the vehicle occupants and also absorbing some of the crash energy during the impact. For sensing an approaching vehicle or an object, called as a bullet vehicle or a bullet object, many cars are equipped with detection systems that include radar sensors, such as those used in vehicle blind-spot detection systems, to provide information signals preceding an impact threat.

A bullet vehicle has a specific velocity as it approaches the vehicle being affected by the collision (hereinafter referred to as 'target vehicle'). Typically, for protection systems using airbags, during side collisions, the target vehicle door's velocity continues to increase until the airbag which is mounted on the target vehicle's door, gets fully deployed and contacts the target vehicle's occupant sitting next to the door. The target vehicle's occupant picks up a velocity inwards and away from the side door, when the airbag contacts the occupant. The target vehicle also acquires a lateral velocity in the direction of impact. Finally, all the three velocities, i.e., the bullet vehicle's velocity, the occupant's velocity and the target vehicle's velocity, acquire a common value at a certain time.

During a side-impact, deployment of an airbag as early as possible can significantly reduce the amount of impact injury to a side occupant. Specifically, during a side collision, the rate of increase of the occupant's lateral velocity (i.e., the occupant's lateral acceleration), which depends on the occupant's interaction with the airbag is directly proportional to the impact force experienced by the occupant. A reduction in occupant's lateral acceleration during a side impact helps to reduce the risk of injury to the occupant. Attempts have been made in the art along this direction, by utilizing existing crush space between the side-impact door and the occupant. For example, some disclosures have been directed towards increasing the stiffness of the side impact protection structures and mechanisms, to absorb maximum crash energy, and thus reduce the occupant's acceleration. However, such attempts to reduce the occupant's lateral velocity increment rate (i.e., occupant's lateral acceleration) add significant weight and other design complexities to the vehicle.

Therefore, there exists a need for a side-impact protection system that can help to reduce the injury risks during side-impacts.

SUMMARY

The present disclosure describes a side-impact protection system, and a method for protecting the occupant of a vehicle, during a side impact.

In one aspect, the present disclosure provides a method of protecting an occupant of a vehicle during a side-impact. The method includes detecting a vehicle approaching the occupant's vehicle, and identifying whether it poses a potential collision threat. A collision threat is assessed based on a set of parameters, and it is determined whether the collision threat due to the approaching vehicle exceeds a pre-determined threshold level. This determination is concluded based on certain observations, including, for instance, detecting the approaching vehicle within a specific distance from the occupant's vehicle for a certain period of time, or identifying that the approaching vehicle's relative velocity towards the occupant's vehicle is beyond a certain level, etc. When the collision threat exceeds the pre-determined threshold level, the side-impact door of the occupant's vehicle is pushed outwards in a direction away from the occupant, and locked in a specific position, to provide some extra pre-crush space. A side airbag is deployed between the occupant and the side door to be potentially impacted, at a specific time after locking the door. This time is determined based on a set of conditions.

In another aspect, the disclosure provides a side-impact protection system for protecting the occupant of a vehicle from a collision due to an approaching vehicle. The system includes a pre-crash sensing system that detects the approaching vehicle, and identifies a collision threat. A door push and lock mechanism is coupled to the pre-crash sensing system. On receiving a potential collision threat signal from the pre-crash sensing system, the push and lock mechanism pushes the side door to be potentially impacted outwards and away from the occupant, and locks it in a specific position. An airbag deploying module deploys an airbag between the occupant and the side door to be potentially impacted, at a specific time, based on a set of conditions. Such conditions include assuring that the approaching vehicle contacts the occupant's vehicle and exerts a minimum resultant force on the occupant's vehicle. This is detected by a set of pressure-sensors and acceleration detecting sensors disposed at the impact side of the occupant's vehicle.

Additional aspects, features, advantages and objects of the present disclosure would be made apparent from the drawings and the detailed description of the illustrative embodiments, construed in conjunction with the appended claims that follow.

BRIEF DESCRIPTION OF THE DRAWINGS

FIG. 4 (c) shows the front view of another possible design of the unlatching mechanism of FIG. 4 (a), in accordance with the present disclosure.

DETAILED DESCRIPTION OF ILLUSTRATIVE EMBODIMENTS

Figure 1:
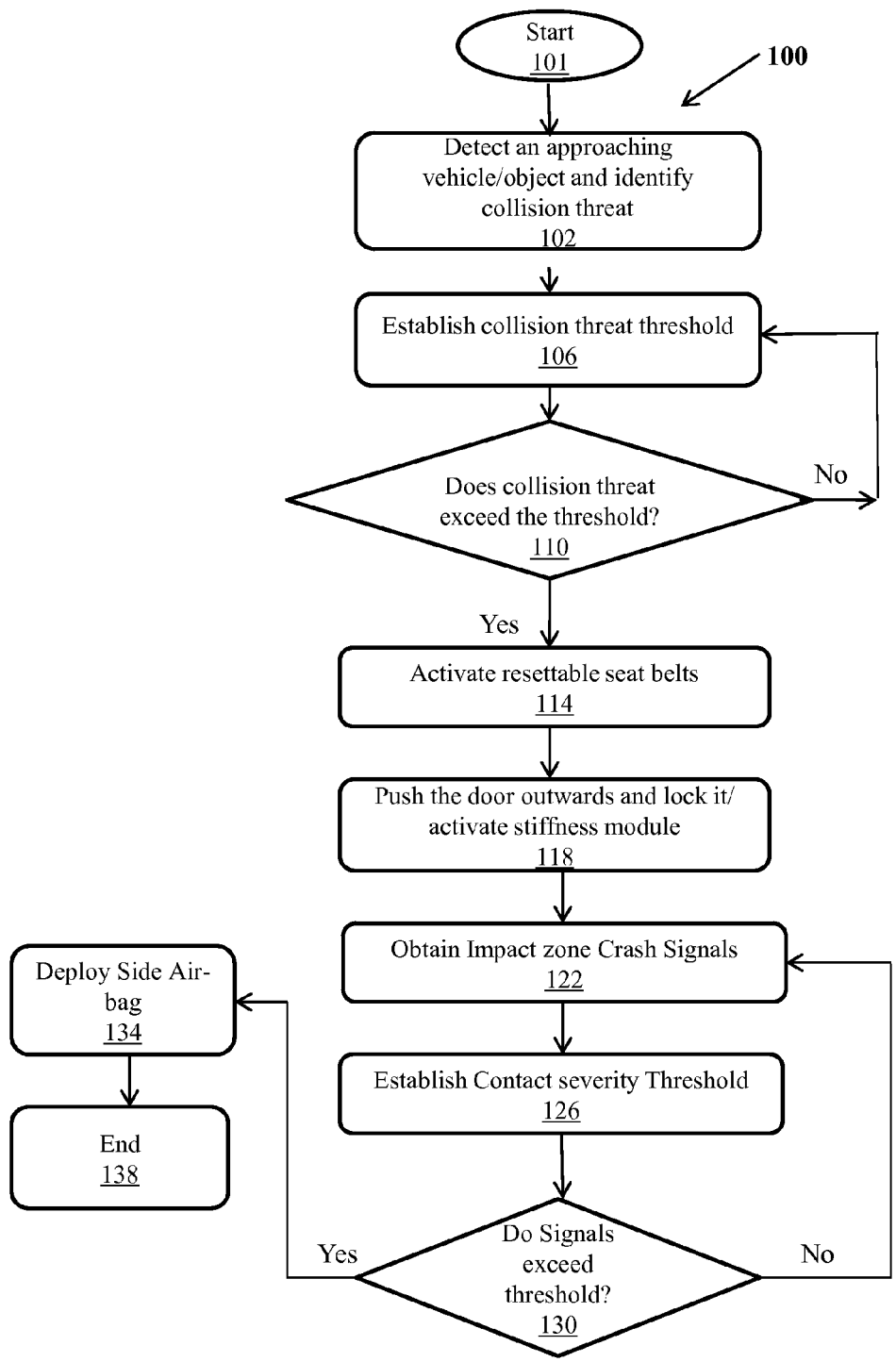
FIG. 1 is a flow chart illustrating the steps involved in protecting an occupant of a vehicle during a side-impact, in accordance with the present disclosure.

The following detailed description illustrates aspects of the claimed invention and the ways to implement it. However, the description is not intended to define or limit the invention, such definition or limitation being solely contained in the claims appended thereto. Although the best mode of carrying out the invention has been disclosed comprehensively, those in the art will recognize that other embodiments for carrying out or practicing the invention are also possible.

The present disclosure pertains to a method and a system for protecting an occupant of a vehicle during a side-impact/collision due to an approaching vehicle, by pushing the side door to be potentially impacted outwards and away from the vehicle occupant, thus creating an additional side-crush distance between the occupant and the side-impacted door, and deploying the side airbag a few milliseconds before it is conventionally deployed by the side-impact protection systems in the art.

Hereinafter, the vehicle experiencing the collision threat will be referred to as 'target vehicle' and the vehicle approaching the target vehicle, and providing the collision threat, will be referred to as 'bullet vehicle'. Further, wherever mentioned hereinafter, the term 'occupant' would refer to the occupant of the target vehicle sitting next to the door being impacted and being subjected to an injury risk during side impact. Further, the side door of the target vehicle, to be potentially impacted, will be simply referred to as 'impact door', for simplicity and economy of expression.

Many different methods for sensing a bullet vehicle and predicting an impending collision are now available in the art. These methods include systems installed at appropriate locations in automobiles, for pre-crash sensing. Such methods generally use side-sensing systems for detecting approaching vehicles, and include radars, image processors, range sensors and side cameras in collaboration. Typical examples are blind-spot monitoring systems and lane change assistance (LCA) systems for vehicles. Blind-spot detection systems are basically short range sensing systems to detect objects in the vehicle's blind spots, in the adjacent lanes just behind the vehicle. Lane change aid systems monitor objects in the adjacent lanes behind the vehicle for longer distance, as compared to blind spot detection systems, to assist the vehicle operator in changing the lanes in a safe manner. One of the common sensors used for blind spot detection and lane change aid systems is a medium range sensing radar which normally operates at about 24 GHz. Vision based systems that use cameras, image processors and radars operating at different frequencies, such as radars operating at 77 GHz range, can also be used with these systems. Another example of a side pre-crash sensing system is a system which uses two 24 GHz radars mounted near or on rear-quarter panels and monitors vehicles on both sides of the vehicle. Using several beams of a multi-beam radar sensor, the system accurately determines the position, the distance and the relative speed of the vehicles approaching from the rear, and from the sides of the target vehicle. The range of this system is around 40 meters with about a 150 degree field of view.

An injury caused to a target vehicle's occupant during a side collision is directly proportional to the rate of increase of his lateral velocity (i.e., occupant's lateral acceleration), and the lateral acceleration of the occupant is proportional to the net force acting on him during the collision. Attempts have been made in the art to reduce the occupant's lateral acceleration during a side collision. Such attempts include making the target vehicle's side structure stiffer to lower the door velocity, and to effectively utilize the pre-crush space between the impacted side door and the occupant. By increasing the stiffness of the side structure, more crash energy is absorbed by the structure during the impact. However, these side structure modifications result in substantial weight increase and may not be the most efficient way to enhance occupant protection.

The present disclosure unveils an effective way to reduce injury risks to the occupant during a side-impact, by further reducing the occupant's acceleration. This is achieved by creating an additional pre-crush space between the side-impacted door and the occupant, and deploying the side airbag a few milliseconds before it would be conventionally deployed during a side-collision. The extra pre-crush space between the occupant and the door is created by pushing the impact door outwards and away from the occupant, and locking it in a specific position, based on certain pre-crash sensing conditions.

FIG. 1 shows the various steps involved in a method 100 for protecting an occupant of a target vehicle during a side-impact. The method starts at step 101 and at step 102, the method detects a bullet vehicle proximal to the target vehicle, and identifies a collision threat. This step includes detecting objects close to the target vehicle, through a pre-crash sensing system, with appropriate modules of the system disposed at suitable locations on the target vehicle, and establishing a list of such objects. A potential impact object is identified from the list, and the object is construed as a bullet vehicle or a bullet object, posing a potential collision threat to the target vehicle, if certain criteria like the mass or size of the object exceeds a certain minimum limit. This is done to gain a high level of confidence from the signal received from the pre-crash sensing system. After identifying the collision threat, at step 106, a pre-determined collision threat threshold is established and the method 100 determines a collision threat based on a set of parameters. Such parameters may include, though not be limited to, a minimum approach distance value between the bullet and the target vehicles, a minimum relative velocity of the bullet vehicle with respect to the target vehicle, or the presence of the bullet vehicle within a specific range of angles, in the field of view of the target vehicle's pre-crash sensing system, or a combination thereof. At step 110, the method 100 compares the actual collision threat due to the bullet vehicle, with the pre-determined collision threat threshold level. At step 114, if the collision threat exceeds the threshold level, the method activates safety measures depending upon the extent of the threat. Such safety measures may include, though not be limited to, adjusting the resettable settings for the seat belts and alerting the occupant by suitable haptic, audio or visual means. Further, at step 118, the impact door is pushed a few centimeters outwards and locked in a specific position, through a suitable push and lock mechanism. This increases the pre-crush space or the gap between the door and the occupant. Further, an incremental side-stiffness may be added between the impact door and the vehicle's side structure, by activating a pyrotechnic or other stiffness enhancing modules (though not shown or described) at this step. At step 122, pressure sensors disposed at appropriate locations within the impact door cavity over the impacted side of the vehicle, measure the change in pressure in the door cavity, due to side collision. The change in pressure is directly related to collision severity between bullet and target vehicles. In some alternate embodiments, some acceleration detecting sensors or accelerometers may also be disposed at the sides of the vehicle structure, to measure the lateral acceleration of the target vehicle to assess the severity of collision between the bullet and target vehicles. These acceleration and pressure sensors measure the lateral acceleration and door cavity pressure values continuously during the collision and provide the corresponding signals to a Restraint Control Module (RCM), for use by the occupant protection system of the vehicle. At step 126, a certain contact severity threshold is established based on a set of conditions. The conditions or parameters may include, though not be limited to, the pressure and accelerometer signals exceeding specific pre-determined values. At step 130, the method 100 confirms whether the crash signals exceed the pre-determined threshold level. If yes, then at step 134, the side airbag is deployed between the occupant and the door. Effectively, the method deploys the airbag only after the bullet vehicle touches the impact door and applies at least a certain minimum level of contact force on the target vehicle, along the direction of impact. The check-point at this step incorporates the case when a false assessment of the impact object may be made under certain circumstances. For instance, an object with a low mass, like some debris, may be somehow detected as the bullet vehicle, by the target vehicle's pre-crash sensing system, and the airbag would not be deployed in such a case. Further, the pushed and locked door can be retracted to its previous position, either manually or automatically, in those false assessment cases.

In one embodiment, the airbag is deployed straightaway, without the need to perform the steps 122 through 130, depending upon the level of confidence achieved by the vehicle's pre-crash sensing system, at step 110. This corresponds to cases where the target vehicle is equipped with an extremely accurate pre-crash sensing system, which may be a multi-sensor fused system using electronically scanning radar or a multi-beam radar along with other sensors such as, a vision sensor or a scanning LIDAR sensor to accurately identify the approaching vehicle. The level of confidence achieved in identifying the bullet vehicle and the collision threat would be substantially high in those cases, so it may not be necessary to perform any further checks. Specifically, in such cases, the airbag is deployed a few milliseconds after the side-impact door is pushed outwards and locked. In some embodiments, the reaction to the deployment of the side airbag itself may be used to push the door outwards, once the door is unlatched.

Figure 6:
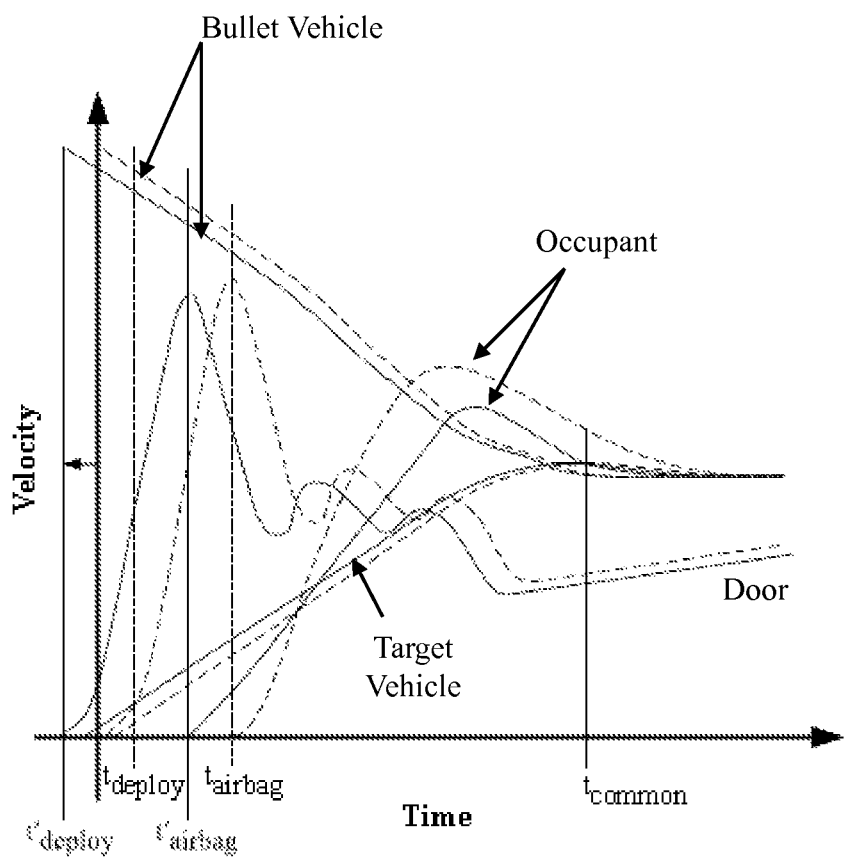
FIG. 6 is a velocity-time graph illustrating the velocity variations for the impacted side door, the occupant, the approaching vehicle and the occupant's vehicle, during a side-impact.

Generally side airbags are designed so that they are fully deployed by the time they are in contact with the occupants sitting next to the impact door. Once the side airbag gets fully deployed and contacts the occupant, the door's velocity starts decreasing, and the occupant's velocity starts increasing. This will be explained in further details hereinafter, in conjunction with the cumulative velocity-time graph depicting variations in the velocity of the side occupant, the impact door, and the bullet and target vehicles, as shown in FIG. 6.

Figure 2:
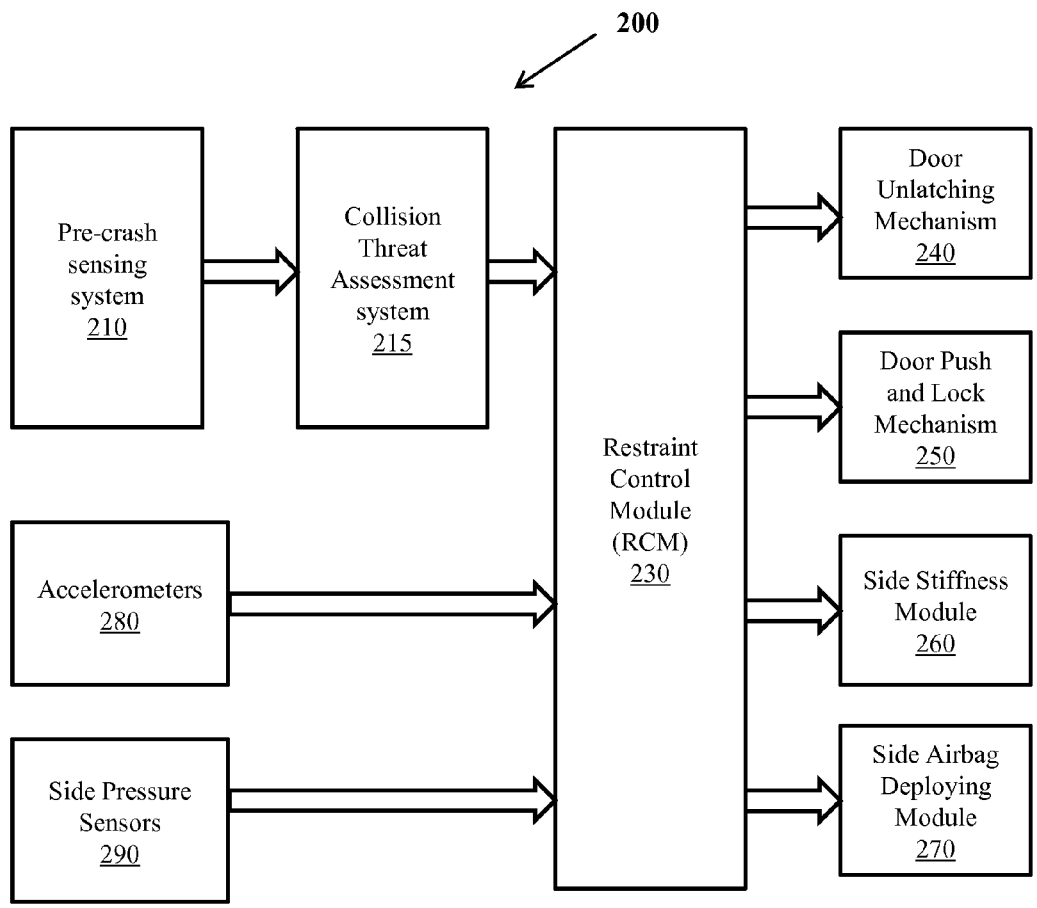
FIG. 2 depicts a schematic diagram illustrating the different components of a side-impact protection system, for protecting a vehicle's occupant during a side impact, in accordance with the present disclosure.

FIG. 2 is a schematic diagram representing the side-impact protection system 200, for protecting the occupant of the target vehicle, in accordance with the present disclosure. For economy of expression, the side-impact protection system 200 would be simply referred to as 'system 200' hereinafter. As shown, the system 200 includes a pre-crash sensing system 210 for sensing a bullet vehicle approaching the target vehicle. The pre-crash sensing system 210 includes suitable devices known in the art, for identifying the bullet vehicle, for determining its relative velocity, its acceleration of approach or its exact distance from the target vehicle, etc. The devices may include radar-based sensors or vision-based sensors, located at the vehicle's side mirrors or any other suitable location. In an embodiment, the system 210 may use other side-sensing systems already provided in the vehicle, such as the blind-spot monitoring system that uses medium range radar sensors operating at about 24 GHz, as described before. Further, any other appropriate side-sensing systems may also be used, including, the Eaton VORAD system that uses range-gated Doppler radar at about 24 GHz or the Valeo Raytheon system that uses similar frequency multi-beam radars for blind-spot monitoring on both the sides of the target vehicle. A collision threat assessment system 215 (hereinafter referred to as 'system 215'), is an integral part of the system 200, and is meant to assess a collision threat based on a set of aforementioned parameters. The system 215 gets inputs from the pre-crash sensing system 210, assesses the severity and confidence level of collision threat, by comparing the collision threat to a pre-determined threshold level, and identifying whether the collision threat due to the bullet vehicle exceeds the threshold level, based on a set of conditions described before. The system 215 is coupled to a Restraint Control Module 230 (hereinafter 'RCM 230'), and it conveys the collision threat signal to the RCM 230. Though the system 215 is shown as a separate module, in an embodiment, it may also be an integral part of the pre-crash sensing system 210, or the RCM 230.

The RCM 230 is operatively coupled to a Door unlatching mechanism 240, a door push and lock mechanism 250 and a side airbag deploying module 270. Optionally, the RCM 230 may also be connected to a side stiffening module 260. The side stiffening module 260 (though not described in details in the disclosure), is configured to add incremental stiffness between the impact door and the target vehicle's side structure, when the impact door is in the pushed out and locked position. Adding stiffness to the side structure further lowers the impact door's lateral velocity, and reduces occupant injury risk.

When the collision threat due to the bullet vehicle exceeds the pre-determined threshold level, the RCM 230 sends a signal to the door unlatching mechanism 240. On receiving the signal, the door unlatching mechanism 240 unlatches the impact door, and enables it to be pushed outwards, away from the side occupant. When the impact door gets unlatched, the push and lock mechanism 250 pushes the door a few centimeters outwards, away from the side occupant, and locks the door in the pushed out position. Specifically, the push and lock mechanism 250 rotates the impact door about the door hinges, to push it outwards, and then locks it in that position. As the door gets pushed out, an additional pre-crush space is created between the occupant and the door. This additional pre-crush space enables the use of a larger and softer side airbag, and thus assists in reducing the lateral acceleration, and the injury risk to the occupant, during a side collision. This will be described hereinafter, with reference to FIG. 5. The side airbag deploying module 270 (hereinafter 'module 270') is provided to deploy the side airbag between the occupant and the door at a specific time, based on certain conditions. As shown in FIG. 2, the RCM 230 is also connected to pressure sensors 290 and accelerometers 280 disposed at suitable locations on both sides of the target vehicle. The pressure sensors 290 measure the change in pressure within the door cavities at the impacted side of the target vehicle, during a side collision. This provides a measure of the severity of impact during the collision. Further, the accelerometers 280 measure the relative acceleration of the target vehicle along the direction of impact. The RCM 230, being coupled to the module 270, communicates a command to the module 270, to deploy the side airbag at the time when the bullet vehicle applies a certain minimum amount of force on the target vehicle, after contacting it. Eventually, if the contact force exceeds a certain minimum value, the module 270 deploys the airbag between the occupant and the impact door. This incorporates the case of a fault assessment by the pre-crash sensing system 210, and ensures appropriate deployment of airbag, i.e., only in cases when required.

In an embodiment where the pre-crash sensing system 210 provides a highly confident detection of a bullet vehicle posing a collision threat to the target vehicle, the airbag may be deployed straightaway, a few milliseconds after the activation of push and lock mechanism 250, with no dependence on the signals received from the pressure sensors 290 or accelerometers 280.

Figure 3A:
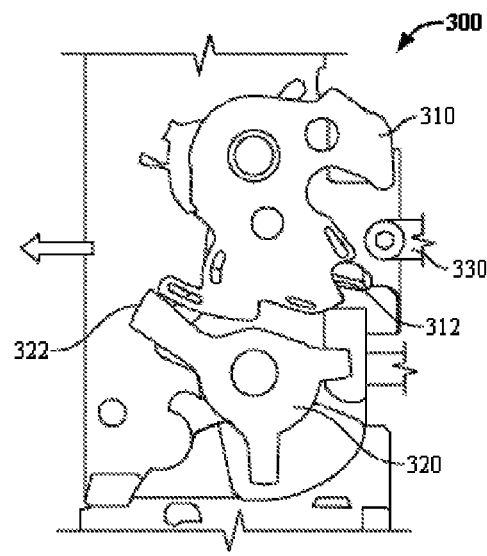
FIG. 3 (a) and FIG. 3(b) show the front view and the isometric view, respectively, of a conventional door locking mechanism.

FIG. 3 (a) is a front view of a conventional door latching mechanism 300, when the door is in an unlatched position. As shown, the mechanism 300 includes a latch 310, a ratchet 320 and a striker 330. The striker 330 is fixedly attached to the body of the car, at an appropriate position on a B-pillar. The latch 310 has a tendency to rotate counter-clockwise by virtue of a spring (not shown). The ratchet 320 is spring biased to rotate in clockwise direction. The shown configuration corresponds to the unlatched positions of the latch 310 and the ratchet 320.

Figure 3B:
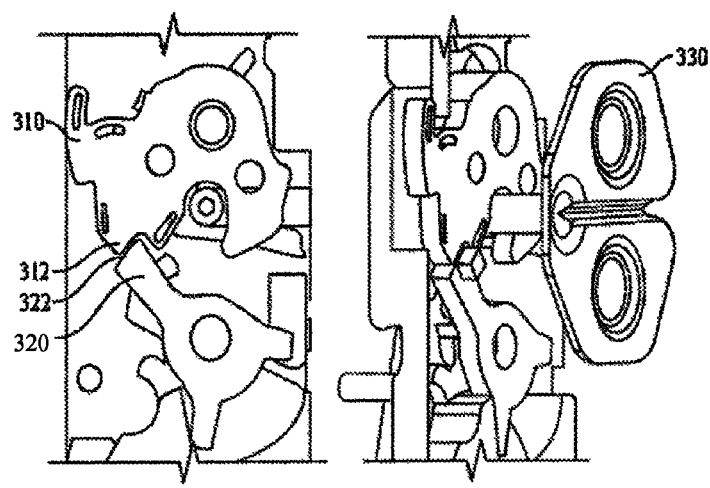

FIG. 3 (b) shows the front and the perspective views of the conventional door latching mechanism 300 in the latched position. Explaining in conjunction with FIG. 3 (a), when the door is swung to close it, the latch 310 starts rotating in clockwise direction till an arcuate portion 312 of the latch engages with the surface 322 of the ratchet 320 (as shown in FIG. 3(b)). At this position, the door is completely shut and the ratchet 320 prevents the latch 310 from rotating further, in the counter-clockwise direction. In this position, the door is latched from opening, by the interaction between the latch 310 and striker 330, until the ratchet 320 is rotated counter-clockwise to release the latch 310.

Figure 4A:
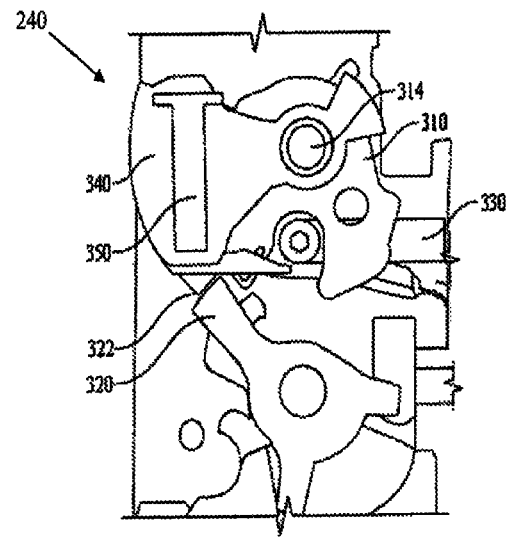
FIG. 4 (a) and FIG. 4 (b), show the front view of a mechanism at two different positions, for unlatching a vehicle's door, in accordance with the present disclosure.
Figure 4B:
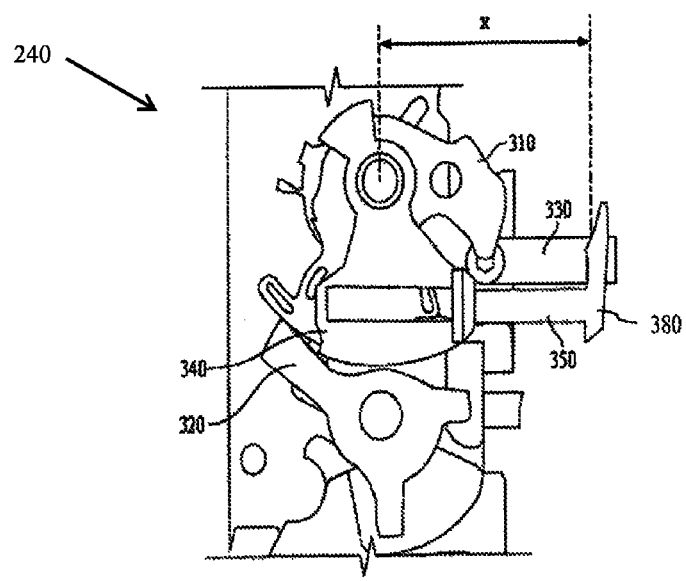
Figure 4:
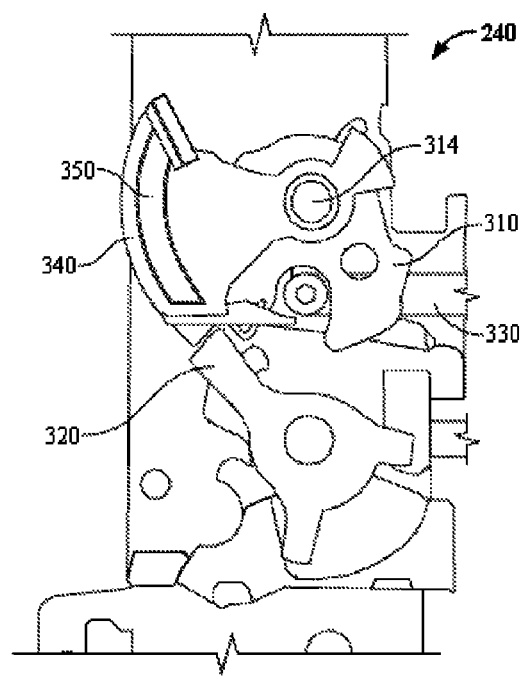

FIG. 4 (a) shows a front view of the door unlatching mechanism 240 in accordance with the present disclosure, for unlatching the target vehicle's door, so that it can be pushed outwards and locked in a specific position. The shown orientation corresponds to the latched position of the door. As shown, the mechanism 240 includes a latch 310, a ratchet 320 and a striker 330. The striker 330 is fixed to the B-pillar of the car. An unlatching plate 340 (hereinafter referred to as 'plate 340') is positioned coaxially with the latch 310, and the plate 340 is spring-biased to have a natural tendency to rotate clockwise. A shaft 314 acts as a common axis of rotation for the plate 340 and the latch 310. The latch 310 may be mounted with a bushing so that the plate 340 can rotate independently with respect to the latch 310. Rotation of the plate 340 in counter-clockwise direction brings the door into an unlatched position and initiates the door opening. To enable counter-clockwise rotation of the plate 340, an electromagnetic device (not shown), or any other appropriate means known in the art, is used, which rotates the shaft 314 in a counter-clockwise direction. A catcher 350 is provided within the plate 340. The catcher 350 is spring biased to slide over the plate 340. In the shown latched position, the catcher 350 is held from moving downwards, by the ratchet 320. The catcher 350 can be an L-shaped bolt or any other device of a suitable shape, to eventually engage with the striker 330, to prevent the door from swinging wide opening when the door is pushed open by the door push and lock mechanism 250. While being engaged with the striker 330, the catcher 350 prevents the pushed door from moving further beyond the limit marked 'X', in FIG. 4 (b).

FIG. 4 (b) shows the door unlatching mechanism 240, in accordance with the present disclosure, in the configuration when the door gets unlatched, and is enabled to be pushed outwards and locked. The transition of the mechanism 240 from the orientation shown in FIG. 4 (a), to that shown in FIG. 4 (b), to unlatch the door, is now explained in conjunction with these figures. When the restraint control module 230 (shown in FIG. 2) sends a signal to the mechanism 240, the mechanism 240 rotates the shaft 314 in counter-clockwise direction, through an electromagnetic means or any other appropriate means. The unlatching plate 340 starts rotating with the shaft 314, in counter-clockwise direction. As the plate 340 starts rotating, the catcher 350 pushes the ratchet 320 downwards and compels it to rotate counter-clockwise. This disengages the latch 310 from the ratchet 320, and brings the door into an unlatched position. As soon as the door is unlatched, the RCM 230 sends a signal to the door push and lock mechanism 250, to push the door outwards, and lock it. The push and lock mechanism 250 as depicted in FIG. 2, though its components and positioning within the target vehicle, not being shown herein, is positioned at an appropriate location over or proximal to the B-Pillar of the target vehicle. Further, it employs a solenoid and a spring-loaded push rod, or any other suitable pushing mechanism known in the art, to push the door outwards and lock it. As the door swings open at the hinge, the short leg 380 of the catcher engages the striker 330, and prevents the door from opening beyond a limited distance, marked as 'X' in FIG. 4(b). Specifically, the limit 'X' represents the distance by which the door is displaced or pushed out.

As shown in FIG. 4 (c), in an embodiment, the catcher 350 is substantially curvilinear, to provide greater flexibility in operations of the unlatching mechanism 240 of the present disclosure. However, the functionality of the catcher 350 and other components of the mechanism 240, remain the same, as previously described.

Figure 5:
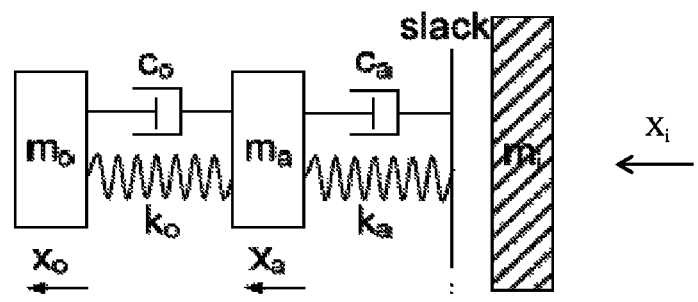
FIG. 5 (a) and FIG. 5 (b) depict the damping coefficients and the stiffness coefficients associated with the occupant, the airbag and the intruding door, drawing a comparison between the conventional mode of operation, and the case in accordance with the present disclosure, where the target vehicle's door is pushed outwards and locked.
Figure 5:
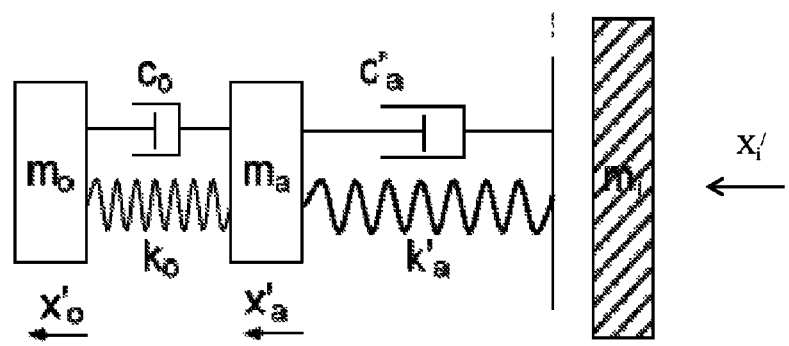

FIG. 5 (a) and FIG. 5 (b) draw comparisons between the normal mode of operation, and the mode in accordance with the present disclosure, when the door is pushed outwards and locked, clearly illustrating the stiffness and the gap effects associated with the occupant, the airbag and the side-impact door. The following references have been used:

$x_o$=Occupant displacement
$x_a$=Airbag displacement
$x_i$=Intruding mass displacement
$x_o'$, $x_a'$ and $x_i'$ represent the corresponding variables when the door is pushed outwards and locked.
Further, $m_o$, $m_a$ & $m_i$ represent the masses of the occupant, the airbag and the intruding mass respectively.
$k_o$=Occupant stiffness and
$k_a$=Airbag stiffness.
Writing acceleration equations for the occupant, the airbag and the door for the normal mode shown in FIG. 5(a), when the door is not pushed out, we have:

$$m_o \ddot{x}_o = k_o(x_a - x_o) \quad \text{(i)}$$

$$m_a \ddot{x}_a = k_a(x_i - x_a) - k_o(x_a - x_o) \quad \text{(ii)}$$

$$\text{and, } m_i \ddot{x}_i = -k_a(x_i - x_a) \quad \text{(iii)}$$

As shown in FIG. 5 (b), in the side-impact model of the present disclosure, where the door is pushed out and locked, creating extra pre-crush space between the door and the occupant, the corresponding equations are:

$$m_o \ddot{x}'_o = k_o(x'_a - x'_o) \quad \text{(iv)}$$

$$m_a \ddot{x}'_a = k'_a(x'_i - x'_a) - k_o(x'_a - x'_o) \quad \text{(v)}$$

$$\text{and, } m_i \ddot{x}'_i = -k'_a(x'_i - x'_a) \quad \text{(vi)}$$

Further, an additional extra pre-crash space 'Δ' is created, as shown in FIG. 5 (b). Comparing Eqn. (iii) & (vi), and considering that $x'_i - x'_a > x_i - x_a$, when the door is pushed outwards, $k'_a$ can be smaller than $k_a$ for absorbing the same crash energy during the impact. This implies that a thicker and softer airbag can be used, when the door is pushed a few centimeters outwards and locked, compared to the normal mode.

Integrating equations (i) to (iii), we have:

$$m_o v_o^2 = k_o(x_a^2 - x_o^2) \quad \text{(vii)}$$

$$m_a v_a^2 = k_a(x_i^2 - x_a^2) - k_o(x_a^2 - x_0^2) \quad \text{(viii)}$$

$$m_i(v_i^2 - v_{i\_ini}^2) = -k_a(x_i^2 - x_a^2) \quad \text{(ix)}$$

Using equations (vii) & (viii) in eq. (ix), $$v_i |_t = \left[ v_{i\_ini}^2 - \frac{k_a}{m_i}(x_i^2 - x_a^2) \right]^{1/2} \quad \text{(x)}$$

From Eq. (x), if $k_a$ is smaller, then it takes a longer time for the door's velocity at any time to reach an expected velocity. Again, by rearranging Eq. (vii) to (ix), if $m_a$ is considerably smaller, $$v_o^2 |_t = \frac{m_i}{m_o}\left( 2v_{i\_ini}^2 - \frac{k_a}{m_i}(x_i^2 - x_a^2) \right) \quad \text{(xi)}$$

Eq (xi) further infers that if $k_a$ is smaller, it takes a longer time for the occupant velocity to reach an expected velocity. Hence, the acceleration of the occupant during the impact is substantially reduced in the case shown in Fig. (b). This considerably reduces the injury caused to the occupant, as the occupant's acceleration is directly proportional to the impact force that the occupant experiences.

FIG. 6 is a velocity time graph showing the velocity variations for the occupant, the door, the bullet vehicle and the target vehicle. The dotted curves correspond to the case shown in FIG. 5(a), when the door is in its usual position, and the solid curves show the respective velocity variations for the case shown in FIG. 5 (b), when the door is pushed a few centimeters outwards and locked. As shown, in both the modes, during impact, the bullet vehicle's velocity keeps on decreasing continuously and the target vehicle's velocity increases, till both of them acquire a common velocity. Further, the door's velocity increases after contact, reaches a maximum value at a time $t_{airbag}$, when the airbag gets fully deployed, and starts decreasing thereafter, due to contact with the occupant. Further, after contact with airbag, generally when the airbag gets fully deployed (at time $t_{airbag}$), the occupant's velocity starts increasing and reaches a maximum, before it decreases again.

Comparing the two cases, when the door is pushed outwards, each specific event occurs a few milliseconds before. For instance, the airbag gets fully deployed and contacts the occupant at time $t'_{airbag}$, which is slightly before the usual airbag contact time $t_{airbag}$. Due to this, the occupant's velocity has more time to reach and equalize with the door and vehicle velocities, and this decreases the acceleration value of the occupant, and thus the injury risks.

Figure 7:
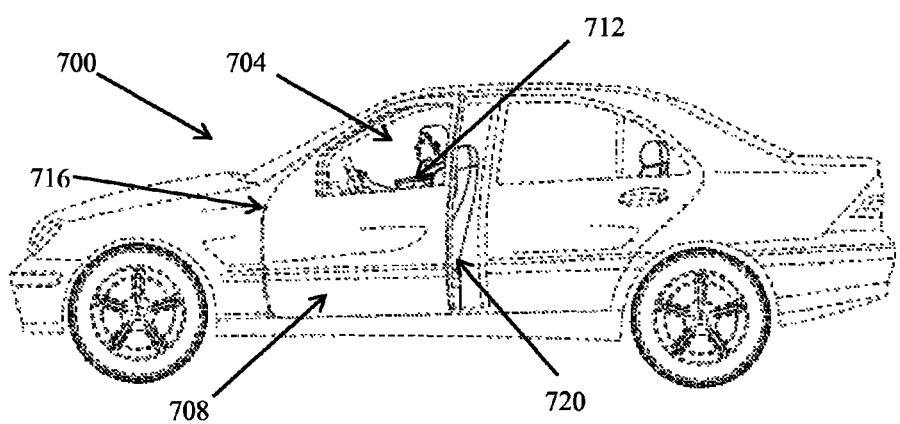
FIG. 7 shows the target vehicle, having an occupant sitting therein, with an airbag deployed between the occupant and the impact door, depicting the impact door being pushed outwards, away from the occupant, in accordance with an embodiment of the present disclosure.

The FIG. 7 illustrates the side view of a target vehicle 700. As shown, a front seat occupant 704 is sitting inside the vehicle 700. When a threat is identified, the impact door 708 is pushed slightly outwards, as shown. Specifically, to bring the door in the shown configuration, the impact door 708 has been unlatched by the door unlatching mechanism 240 of FIG. 2 (not shown herein), and the door push and lock mechanism 250 (not shown herein) has rotated the impact door 708 to swing it open slightly outwards, away from the occupant 704, while being hinged on the side 716, and locked it in the shown configuration. This has created an additional space 720 between the occupant 704 and the impact door 708. Thereafter, as shown, a side airbag 712 is deployed between the occupant 704 and the impact door 708.

The side-impact protection system of the present disclosure can be easily deployed on either side of the vehicle, to protect the occupants sitting next to both front and rear doors. Further, the system is compatible with any particular vehicle, irrespective of its size and make, including cars, trucks and sports utility vehicles etc.

Although the current invention has been described comprehensively, in considerable details to cover the possible aspects and embodiments, those skilled in the art would recognize that other versions of the invention may also be possible. Though, different embodiments of the present disclosure have been set forth above, and different constructions of the invention have been depicted in the appended drawings, however, the disclosed embodiments are not intended to define or limit the scope of the disclosure, such limitation being solely contained in the claims appended hereto, and therefore, other embodiments for carrying out the invention are also possible.

What is claimed is:

1. A side-impact protection system for protecting a vehicle occupant, the system comprising:
    a pre-crash sensing system for detecting an approaching vehicle and identifying a collision threat, wherein the pre-crash sensing system is a radar-based system, a vision-based system, a LIDAR based system, or a combination thereof;
    an unlatching mechanism coupled to a Restraint Control Module, for receiving the signals therefrom, the unlatching mechanism being configured to unlatch the occupant's door;
    a push and lock mechanism coupled to the Restraint Control Module, for receiving signals therefrom, the push and lock mechanism being configured to push the occupant's door outwards and away from the occupant, and for locking the door in a specific position, based on the received signals; and
    an airbag deploying module positioned to deploy an airbag between the occupant and the door, at a specific time, based on a set of conditions.

2. A side-impact protection system of claim 1, further comprising pressure-sensors disposed on the impact side of the occupant's vehicle, the pressure sensors being positioned to determine a change in pressure due to the side-impact, and passing signals to the Restraint Control Module (RCM).

3. A side-impact protection system of claim 2, wherein the RCM is configured to deploy the airbag only when a specific minimum resultant force is applied by the approaching vehicle on the occupant's vehicle, as detected by the pressure sensors mounted on the vehicle.

4. A side-impact protection system of claim 1, wherein the push and lock mechanism is configured to be easily retractable to a previous latched door position, if the pre-crash sensing system performs a false collision threat assessment.

5. A side-impact protection system of claim 1, wherein the unlatching mechanism further comprises:
   a latch rotatably mounted over a shaft, the latch being spring-biased to rotate in a counter-clockwise direction, and adapted to immovably engage with a ratchet in a latched position of the door;
   an unlatching plate mounted coaxially with, and over the latch, and a means for rotating the unlatching plate in counter-clockwise direction;
   a catcher positioned within the unlatching plate, the catcher being spring-biased to move with respect to the plate, along a direction, to disengage the latch from the ratchet, and bring the door in an unlatched position;
   a striker positioned over a B-pillar of the vehicle, and adapted to engage with the catcher when the unlatching plate has moved counter-clockwise substantially, thus allowing the door to open outwards and preventing the door from being pushed beyond an extent.

6. A system of claim 5, wherein the means for rotating the unlatching plate counter-clockwise, is electromagnetically driven.

7. A system of claim 5, wherein the catcher is configured to move vertically downwards initially, as the unlatching plate starts rotating counter-clockwise, thus enabling disengagement of the latch from the ratchet, to unlatch the door.

8. A system of claim 5, wherein the catcher is substantially L-shaped, with a bottom surface thereof initially engaging with a portion of the ratchet, when the door is in a latched position.

9. A system of claim 5, wherein the catcher is substantially arcuate, with a portion thereof initially engaging with a portion of the ratchet, when the door is in a latched position.

10. A system of claim 5, wherein the extent to which the door is pushed outwards, depends upon the dimensions of the catcher.

11. A vehicle including a door, and a door unlatching mechanism comprising:
   a latch rotatably mounted over a shaft, the latch being spring-biased to rotate in a counter-clockwise direction, and adapted to immovably engage with a ratchet in a latched position of the door;
   an unlatching plate mounted coaxially with, and over the latch, and a means for rotating the unlatching plate in counter-clockwise direction;
   a catcher positioned within the unlatching plate, the catcher being spring-biased to move with respect to the unlatching plate, along a direction, to disengage the latch from the ratchet, and bring the door in an unlatched position;
   a striker positioned over a B-pillar of the vehicle, and adapted to engage with the catcher when the unlatching plate has moved counter-clockwise substantially, thus allowing the door to open outwards and preventing the door from being pushed beyond an extent.

12. A system of claim 11, wherein the means for rotating the unlatching plate counter-clockwise, is electromagnetically driven.

13. A system of claim 11, wherein the catcher is configured to move vertically downwards initially, as the unlatching plate starts rotating counter-clockwise, thus enabling disengagement of the latch from the ratchet, to unlatch the door.

14. A system of claim 11, wherein the catcher is substantially L-shaped, with a bottom surface thereof initially engaging with a portion of the ratchet, when the door is in a latched position.

15. A system of claim 11, wherein the catcher is substantially arcuate, with a portion thereof initially engaging with a portion of the ratchet, when the door is in a latched position.

16. A system of claim 11, wherein the extent to which the door is pushed outwards, depends upon the dimensions of the catcher.

* * * * *